(12) United States Patent
Geiger et al.

(10) Patent No.: US 9,582,891 B2
(45) Date of Patent: *Feb. 28, 2017

(54) METHOD AND APPARATUS FOR SEGMENTING AN IMAGE IN ORDER TO LOCATE A PART THEREOF

(71) Applicant: New York University, New York, NY (US)

(72) Inventors: Davi Geiger, New York, NY (US); Hiroshi Ishikawa, New York, NY (US)

(73) Assignee: New York University, New York, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/507,268

(22) Filed: Oct. 6, 2014

(65) Prior Publication Data
US 2015/0055877 A1 Feb. 26, 2015

Related U.S. Application Data

(63) Continuation of application No. 13/768,917, filed on Feb. 15, 2013, now Pat. No. 8,854,363, which is a
(Continued)

(51) Int. Cl.
*G06T 7/00* (2006.01)
*G06K 9/34* (2006.01)
(Continued)

(52) U.S. Cl.
CPC ............ *G06T 7/0093* (2013.01); *G06K 9/342* (2013.01); *G06K 9/346* (2013.01); *G06K 9/6224* (2013.01);
(Continued)

(58) Field of Classification Search
CPC ...... G06K 9/342; G06K 9/6224; G06K 9/346; G06T 7/0081; G06T 7/0093; G06T 17/00
See application file for complete search history.

(56) References Cited

U.S. PATENT DOCUMENTS 4,905,148 A 2/1990 Crawford
4,989,142 A 1/1991 Crawford
(Continued)

OTHER PUBLICATIONS

Amir A. Amini, Terry E. Weymouth, and Ramesh C. Jain, "Using dynamic programming for solving variational problems in vision," IEEE Transactions on Pattern Analysis and Machine Intelligence, 12(9):855-867, Sep. 1990.
(Continued)

*Primary Examiner* — Abbas Abdulselam
(74) *Attorney, Agent, or Firm* — Andrews Kurth Kenyon LLP

(57) ABSTRACT

A method is disclosed to automatically segment 3D and higher-dimensional images into two subsets without user intervention, with no topological restriction on the solution, and in such a way that the solution is an optimal in a precisely defined optimization criterion, including an exactly defined degree of smoothness. A minimum-cut algorithm is used on a graph devised so that the optimization criterion translates into the minimization of the graph cut. The minimum cut thus found is interpreted as the segmentation with desired property.

20 Claims, 6 Drawing Sheets

Related U.S. Application Data continuation of application No. 13/007,449, filed on Jan. 14, 2011, now Pat. No. 8,441,481, which is a continuation of application No. 11/035,711, filed on Jan. 14, 2005, now Pat. No. 7,893,939, which is a continuation of application No. 09/666,371, filed on Sep. 20, 2000, now Pat. No. 7,212,201.

(60) Provisional application No. 60/155,494, filed on Sep. 23, 1999.

(51) Int. Cl.
  G06K 9/62 (2006.01)
  G06T 17/00 (2006.01)

(52) U.S. Cl.
  CPC ............ *G06T 7/0081* (2013.01); *G06T 17/00* (2013.01); *G06T 2200/04* (2013.01); *G06T 2207/10072* (2013.01); *G06T 2207/20072* (2013.01); *G06T 2207/30004* (2013.01)

(56) References Cited

U.S. PATENT DOCUMENTS

| | | | |
|---|---|---|---|
| 5,170,440 | A | 12/1992 | Cox |
| 5,201,035 | A | 4/1993 | Stytz et al. |
| 5,210,837 | A | 5/1993 | Wiecek |
| 5,583,975 | A | 12/1996 | Naka et al. |
| 5,606,654 | A | 2/1997 | Schuur |
| 5,748,844 | A | 5/1998 | Marks |
| 5,790,692 | A | 8/1998 | Price et al. |
| 5,797,012 | A | 8/1998 | Blainey et al. |
| 5,835,617 | A | 11/1998 | Ohta et al. |
| 5,903,664 | A | 5/1999 | Hartley et al. |
| 6,078,688 | A * | 6/2000 | Cox ............... G06T 7/0083 382/173 |
| 6,278,459 | B1 | 8/2001 | Malzbender et al. |
| 6,301,694 | B1 | 10/2001 | Lee et al. |
| 6,323,846 | B1 | 11/2001 | Westerman et al. |
| 6,324,678 | B1 | 11/2001 | Dangelo et al. |
| 6,362,821 | B1 | 3/2002 | Gibson et al. |
| 6,373,484 | B1 | 4/2002 | Orell et al. |
| 6,373,998 | B2 | 4/2002 | Thirion et al. |
| 6,421,809 | B1 | 7/2002 | Wuytack et al. |
| 6,430,430 | B1 | 8/2002 | Gosche |
| 6,499,137 | B1 | 12/2002 | Hunt |
| 6,512,993 | B2 | 1/2003 | Kacyra et al. |
| 6,516,277 | B2 | 2/2003 | Edgecombe et al. |
| 6,577,992 | B1 | 6/2003 | Tcherniaev et al. |
| 6,594,624 | B1 | 7/2003 | Curet |
| 6,744,923 | B1 | 6/2004 | Zabih et al. |
| 7,212,201 | B1 | 5/2007 | Geiger et al. |
| 8,441,481 | B2 | 5/2013 | Geiger et al. |
| 8,854,363 | B2 * | 10/2014 | Geiger ............... G06K 9/342 345/420 |
| 2002/0048401 | A1 | 4/2002 | Boykov et al. |
| 2003/0206652 | A1 | 11/2003 | Nister |
| 2004/0008886 | A1 | 1/2004 | Boykov |

OTHER PUBLICATIONS

Laurent D. Cohen, On active contour models and balloons. Computer Vision, Graphics and Image Processing: Image Understanding, 53(2): 211-218, 1991.

Laurent D. Cohen and Isaac Cohen, "Finite element methods for active contour models and balloons for 2-d and 3-d images," IEEE Transactions on Pattern Analysis and Machine Intelligence, 15(II): 1131-1147, Nov. 1993.

Ingemar J. Cox, Satish B. Rao, and Yu Zhong, "ratio regions" a technique for image segmentation, in International Conference on Pattern Recognition, vol. II, pp. 557-564, 1996.

Marie-Pierre Dubuisson-Jolly, Cheng-Chung Liang, and Alok Gupta, "Optimal polyline tracking for artery motion compensation in coronary angiography," In International Conference on Computer Vision, pp. 414-419. 1998.

L. Ford and D. Fulkerson, Flows in Networks, Princeton University Press, 1962.

Davi Geiger, Alok Gupta, Luiz A. Costa, and John Viontzos, "Dynamic programming for detecting, tracking, and matching deformable contours," IEEE Transactions on Pattern Analysis and Machine Intelligence, 17(3): 294-402, Mar. 1995.

A. Goldberg and R. Tarjan, A new approach to the maximum flow problem. Journal of the Association for Computing Machinery, 35(4):921-940, Oct. 1988.

D. Greig, B. Porteo-ancl A. Seheult. Exact maximum a posteriori estimation for binary images, Journal of the Royal Statistical Society, Series B, 51(2):271-279, 1989.

Robert M. Haralick and Linda G. Shapiro, Computer and Robot Vision, Addison-Wesley Publishing Company, 1992.

H. Islilkawa and D. Geiger, "Segmentation by grouping junctions," In IEEE Conference on Computer Vision and Pattern Recognition, pp. 125-131, 1998.

Ian H. Jermyn and Hiroshi Ishikawa, "Globally optimal regions and boundaries," In International Conference on Computer Vision, vol. II, pp. 904-910, 1999.

M. Kass, A. Witkin, and D. Terzolpoulos, Snakes: Active contour models. International Journal of Computer Vision, 2:321-331, 1988.

Snow et al. "Exact voxel occupancy with graph cuts", Proceedings of the IEEE Conference on Computer Vision and Pattern Recognition, vol. 1, Jun. 2000, pp. 345-352.

Bonneville et al. "Graph cut: application to Bayesian emission tomography reconstruction", Proceedings of the International Conference on Image Analysis and Processing, Sep. 1999, pp. 1184-1189.

Prosecution history for U.S. Appl. No. 09/943,035 by Boykov, filed Aug. 30, 2001.

* cited by examiner

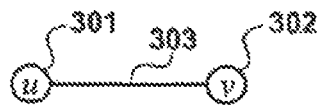
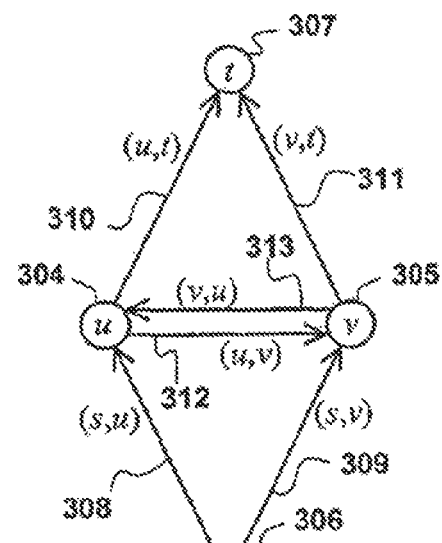
FIG. 3A      FIG. 3B
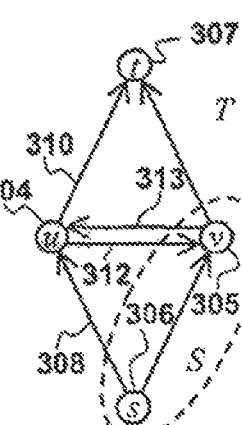 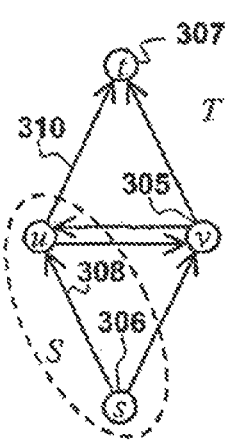 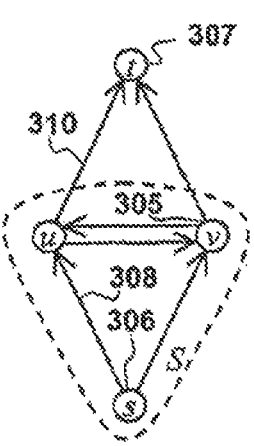
FIG. 4A    FIG. 4B    FIG. 4C    FIG. 4D

METHOD AND APPARATUS FOR SEGMENTING AN IMAGE IN ORDER TO LOCATE A PART THEREOF

CROSS-REFERENCE TO RELATED APPLICATION(S)

This application is a continuation of U.S. application Ser. No. 13/768,917 filed on Feb. 15, 2013, which will issue as U.S. Pat. No. 8,854,363 on Oct. 7, 2014, which is a continuation application of U.S. application Ser. No. 13/007,449 filed on Jan. 14, 2011, which issued as U.S. Pat. No. 8,441,481 on May 14, 2013, which is a continuation application of U.S. application Ser. No. 11/035,711 filed Jan. 14, 2005, which issued as U.S. Pat. No. 7,893,939 on Feb. 22, 2011, which is a continuation application of U.S. application Ser. No. 09/666,371, filed Sept. 20, 2000 which issued as U.S. Pat. No. 7,212,201 on May 1, 2007, the entire disclosures of which are incorporated by reference. The present application also claims priority from U.S. Application Ser. No. 60/155,494, filed Sept. 23, 1999, which is entitled "3D and Higher-dimensional Volume Segmentation via Minimum-cut Algorithms", the entire disclosure of which is incorporated by reference.

BACKGROUND OF THE INVENTION

Field of the Invention

The present invention relates to a method and apparatus for segmenting 3D and higher dimensional images into two subsets in order to locate a part thereof, and in particular, to a method of segmenting without any topological restriction on the resultant subsets.

Description of Related Art

A situation often occurs that a multi-dimensional array that assigns data to each multi-dimensional slot (voxel) is given and a need arises to partition the set of voxels into two or more subsets according to the data.

For instance, it is well known to obtain three-dimensional arrays of data representing one or more physical properties at regular grid positions within the interior of solid bodies. Such data may be obtained by non-intrusive methods such as computed axial tomography (CAT) systems, by magnetic resonance imaging (MRI) systems, or by other non-intrusive mechanisms such as ultrasound, positron emission tomography (PET), emission computed tomography (ECT) and multi-modality imaging (MMI). Each of these techniques produces a planar, grid-like array of values for each of a succession of slices of the solid object, thus providing a three-dimensional array of such values. Typically, the solid object is a human body or a portion thereof, although the method is equally applicable to other natural or artificial bodies. In the case of CAT scanning, the physical value is the coefficient of x-ray absorption. For MRI, the physical values are the spin-spin and the spin-lattice relaxation echoes. In any event, the measured physical values reflect the variations in composition, density or surface characteristics of the underlying physical structures.

It is likewise known to utilize such three-dimensional arrays of interior physical values to generate visual images of the interior structures within the body. In the case of the human body, the visual images thus produced can be used for medical purposes such as diagnostics or for the planning of surgical procedures. In order to display two-dimensional images of such three-dimensional interior structures, however, it is necessary to locate the position of the boundary of such structure within the array of physical values. A significant problem in displaying such internal surfaces is, therefore, the need to segment the data samples into the various tissues. This has been accomplished in the prior art by simply deciding the structure to which each voxel belongs by comparing the data associated to the voxel to a single threshold value, or to a range of threshold values, corresponding to the physical property values associated with each structure or its boundary. Bones or any other tissue, for example, can be characterized by a known range of density values to which the array values can be compared. Such simple thresholding, however, is too susceptible to noise. That is, at the boundary, voxels with values near threshold can be swayed either way by a smallest noise, giving very noisy result. What is needed is to incorporate the tendency of nearby voxels to belong to the same partition.

Domains of applications of segmentation other than medical applications include graphics, visualization tools, and reconstruction of 3D objects. In graphics, it is known to segment an object from an image. When there is a sequence of image (video), it can be considered a 3D image. Thus a segmentation of moving object from a video sequence is an application of 3D segmentation.

Also, the data array is not limited to 3 D Higher dimensional applications include four-dimensional segmentation of a temporal sequence of 3D images, such as a 3D image of beating heart.

It is important in many applications that the resultant sets of voxels are not restricted in the number of connected component. Indeed, it is generally necessary to be able to automatically choose the appropriate number of connected components. Moreover, for a larger class of applications, the subsets should have no topological restrictions at all. For instance, each connected component should be allowed to have as many holes as appropriate to fit the data. Conventional methods have at least one of the following three shortcomings: they either i) have topological restrictions on the solution, ii) are not guaranteed to reach the optimal solution, or iii) need user help or intervention. Some methods presuppose the nature of the set to be found. For instance, if arteries are expected, some methods try to find one-dimensional object with some thickness, making it difficult to find bifurcating arteries. An algorithm that has desirable topological properties is suggested in [O. Faugeras and R. Keriven. "Complete Dense Stereovision Using Level Set Methods", in *Proceedings of the 5th European Conference on Computer Vision*, Springer-Verlag. LNCS 1406, pp. 379-393, 1998], based on an entirely different method (Level Sets of Evolution Equations). Yet, it is a gradient-descent method with no guarantee to reach the optimal. Region Growing methods, similarly, have good topological properties, but require user intervention to select the regions. Moreover, no Region Growing method is an optimization method, that is, they are not guaranteed to give optimum solutions. Another technique described in [J. Shi and J. Malik. "Normalized cuts and image segmentation." in *Proceedings of the IEEE Conference on Computer Vision and Pattern Recognition* 1997, pp. 731-737] uses a graph technique, which approximates the solution (i.e., it is not guaranteed), and perhaps does not have the same topological properties. The present method uses similar technique used in other area, 2D image restoration, described in [D. M. Greig, B. T. Porteous, and A. H. Seheult. "Exact maximum a posteriori estimation for binary images." *Journal of Royal Statistical Society B*, 51, pp. 271-279, 1989].

SUMMARY OF THE INVENTION

Objects and Advantages

Accordingly, it is an object of the invention to provide a method to automatically segment 3D and higher-dimensional images stored in the memory of a computer system into two subsets without user intervention, with no topological restriction on the solution, and in such a way that the solution is an optimal in a precisely defined optimization criterion, including an exactly defined degree of smoothness.

In accordance with this and other objects of this invention, a method of segmenting input data representing an image is described in order to locate a part of the image. The input data further comprises voxels. The method stores a graph data structure in the memory of a computer system. The graph data structure comprises nodes and edges with weights, wherein the nodes comprise nodes s, t, and a plurality of voxel nodes. The edges comprise at least one edge from the node s to at least one of the voxel nodes, at least one edge from at least one of the voxel nodes to the node t, and at least one neighbor edge from at least one of the voxel nodes to another of the voxel nodes. The method further comprises the steps of designating one of the voxel nodes as corresponding voxel node for each of the voxels, setting the weights for the edges, partitioning the nodes into at least two groups, one including the node s and another including the node t, by a minimum-cut algorithm, and partitioning the voxels into at least two segments by assigning each of the voxels to the segment corresponding to the group to which the corresponding voxel node for the voxel belongs.

BRIEF DESCRIPTION OF THE DRAWINGS

Those mentioned above and other objects and advantages of the present invention will become apparent by reference to the following description and accompanying drawings wherein:

FIG. 3A schematically shows the simplest example of the problem;

FIG. 3B shows the corresponding graph that would be used in the method of present invention to solve the problem shown in FIG. 3A;

FIG. 4A through FIG. 4D show the four possible cut of the example graph shown in FIG. 3B;

DETAILED DESCRIPTION OF THE INVENTION

General Description

Hereafter, the dimension of the input data is denoted by DIM. For three dimensions, DIM=3.

Input

Figure 1A:
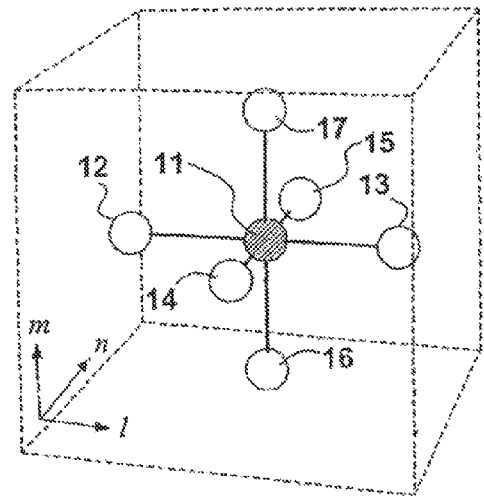
FIG. 1A schematically shows the first nearest neighbors of a voxel in the case of three dimensions.
Figure 1B:
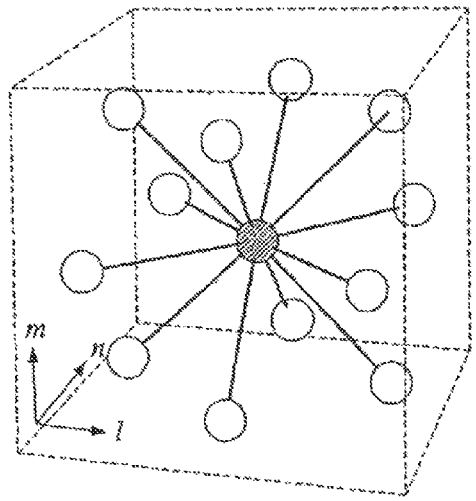
FIG. 1B schematically shows the second nearest neighbors of a voxel in the case of three dimensions.
Figure 1C:
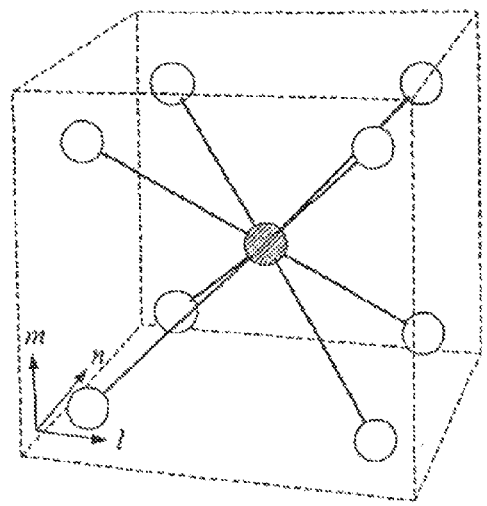
FIG. 1C schematically shows the third nearest neighbors of a voxel in the case of three dimensions.
Figure 1D:
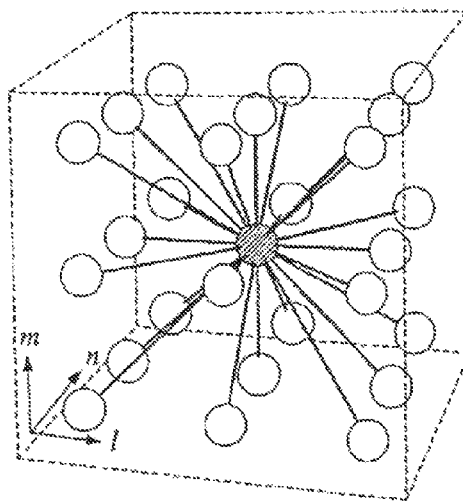
FIG. 1D schematically shows the first, second and third nearest neighbors of a voxel in the case of three dimensions.

In the segmentation problem that the present invention solves, a DIM-dimensional data structure stored in the memory of a computer system is given as the input to the method, which usually is realized as a computer program. In medical applications, the data is typically acquired by non-intrusive methods such as computed axial tomography (CAT) systems, by magnetic resonance imaging (MRI) systems, or by other non-intrusive mechanisms such as ultrasound, positron emission tomography (PET), emission computed tomography (ECT) and multi-modality imaging (MMI), and stored in the memory of a computer system. The data structure will be called an "image" hereafter, and comprises voxels and neighborhood structure:

i. Each voxel has associated data, such as a number or a set of numbers (vector). Voxels are conceptually laid out in a DIM-dimensional configuration. For instance, a 3D (DIM=3) image can be a simple box of size L×N×M with one voxel for each of L×N×M possible combinations of three integers (l, n, m) for l=1, . . . , L, n=1, . . . , N, and m=1, . . . , M. An image can also be a subset of such a DIM-dimensional box.

ii. The neighborhood structure is defined by specifying a small set of "neighbor voxels" for each voxel, according to the application. In other words, it is specified, among all voxels, which voxel is neighboring which other voxels. The specification can be given as a data stored in the memory of a computer system, or it can be given as an implicit assumption in the program that realizes the method of the present invention, i.e., the program may assume a particular arrangement of voxels. The neighborhood structure is symmetric in the sense that if a voxel v is a neighbor of another voxel u, then u is also a neighbor of v. The simplest set of "first nearest neighbors" for a voxel includes 2×DIM nearest voxels given by increasing or decreasing one of DIM coordinate entries by 1. For instance, FIG. 1A conceptually shows the first nearest neighbors of a voxel 11 at coordinate (l, n, m) in a 3D image. Neighbor voxels are 12 at (l−1, n, m), 13 at (l+1, n, m), 14 at (l, n−1, m), 15 at (l, n+1, m), 16 at (l, n, m−1), and 17 at (l, n, m+1). The "second nearest neighbors" are those obtained by changing two of the coordinate entries by 1, and the 3D case is schematically shown in FIG. 1B. Similarly, a k-th nearest neighbor of a voxel v has k coordinate entries that are different by 1 from corresponding entries of v. FIG. 1C shows the third nearest neighbors in the three dimensional case, and FIG. 1D shows the first, second, and third nearest neighbors together in the case of three dimensions. Although such a k-th nearest neighborhood structure is a natural choice, the application of present invention is not limited to this class of neighborhood structures.

The method partitions the voxels into two complementary subsets S and T, or, equivalently, assigns one of two labels s or t to each voxel. The image will be segmented in the sense that voxels in S, to which label s is assigned, will represent the "interesting" voxels for each particular application, such as voxels corresponding to arteries. It is an advantage of the method of present invention that there is no topological restriction on the resultant subsets. Moreover, our method is completely automatic with no need for user intervention, although the method allows the user to intervene as desired in the process to improve or correct the results of the fully automatic system. The method, while addressed and discussed in depth for the 3D case, can be applied by those skilled in the art to higher or lower dimensions in a straightforward way.

The criterion as to how the image should be segmented is given by defining a set of numbers:

a) For each voxel v, a number a(v).
b) For each neighboring pair of voxels v and u, a nonnegative number b(v, u). Note that b(v, u) and b(u, v) can be different.

Then, the criterion is that the partition shall be given so that the sum $$\sum_{\text{all } v \text{ in } T} a(v) + \sum b(v, u) \quad (1)$$

all neighboring (v,u) such that v is in S and u is in T is minimum over all possible assignments.

The number a(v) represents the likelihood of v to belong to S. If a(v) is positive, v is more likely to belong to S in an assignment with a minimum sum (1). If it is negative, it is more likely to be in T in an assignment with a minimum sum (1). The number b(v, u) expresses the likelihood of the boundary coming between v and u in such a way that v is in S and u is in T. It shall be larger if such likelihood is smaller.

As an example of how these numbers may be selected, suppose that the probabilities P(v), of the voxel v belonging to S; and
P(v, u), for neighboring voxels v and u, of v belonging to S and u belonging to T; are known. Then one possible way is to set $$a(v) = A \log(2P(v)),$$

$$b(v,u) = -B \log(P(v,u)),$$

where A and B are some positive numbers. If necessary, infinity in the case of zero probability can be handled in various and well-known ways, for instance by using (P(v)+h)/(1+h) instead of P(v), where h is some small (h<<1) positive number. Some examples of how these numbers may be selected in concrete examples are given in the detailed description of preferred embodiments below.

Method

Figure 2:
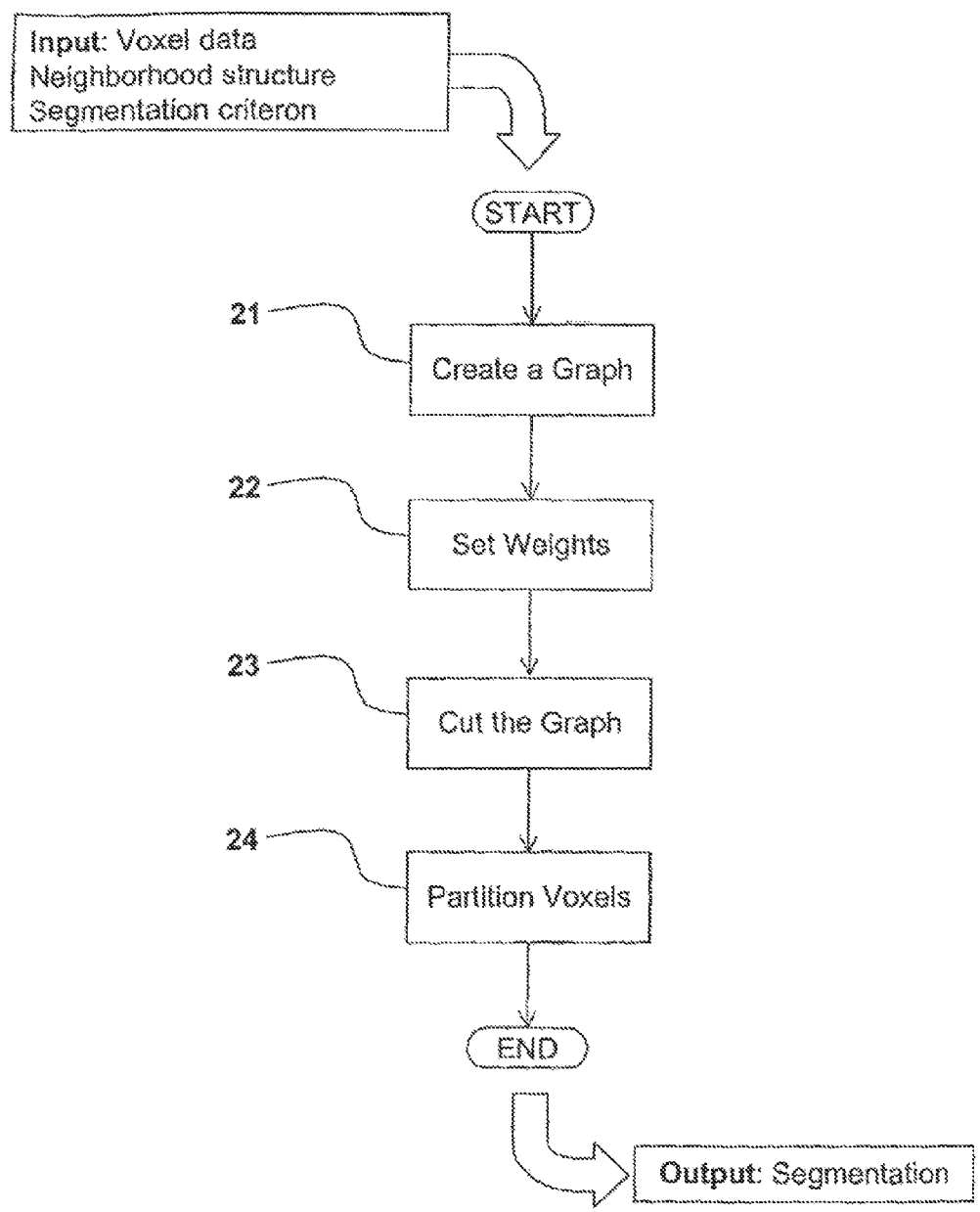
FIG. 2 illustrates the major steps in the method of present invention.

FIG. 2 illustrates the major steps in the method. The main idea of the method is to map the voxels to specially interconnected nodes in a graph. Graphs are used in the art to explain certain ideas clearly; but it is also well known in the art to implement them as a data structures stored in a computer system that can be manipulated by a program. One example of such an implementation is given later in a description of an embodiment.

A directed graph with edge weights, that is, a graph where each edge has a nonnegative number called a weight associated to it, is created in step 21. An edge from a node v to another node u is denoted hereafter by an ordered pair (v, u). The graph contains the following:

(a) There is one node for each voxel. This type of node is hereafter called the voxel node corresponding to the voxel, and the voxel node corresponding to voxel v is denoted by the same letter v.
(b) There also are two special nodes s and t that correspond to the two labels s and t, respectively.
(c) There are edges between voxel nodes. They represent the neighborhood structure between voxels, i.e., voxel nodes corresponding to neighboring voxels are connected by an edge.
(d) For every voxel node v, there is an edge (s, v) from s to v and an edge (v, t) from v to t.

Then, in step 22, nonnegative edge weights are assigned. For each voxel node v, the edge (s, v) has a nonnegative weight w(s, v) and the edge (v, t) has a nonnegative weight w(v, t). These weights are selected so that the following holds:

$$w(s, v) - w(v, t) = a(v). \quad (2)$$

Each voxel node v is also connected to its neighbors. For each neighbor u of v, there are edges (v, u) and (u, v). The edge (v, u) is assigned a weight w(v, u)=b(v, u) and the edge (u, v) is assigned a weight w(u, v)=b(u, v).

These weights are chosen so that the segmentation criterion exactly corresponds to a condition on a cut of the graph. Here, a cut is a partition of the graph into two parts, one including s and another t, as well known to be often defined in the art. Then, each voxel node belongs to one of the parts, either including s or t. This defines a segmentation of the image: a node that belongs to the same partition as node s is assigned the label s, and a node that belongs to the same partition as node t is assigned the label t. If an edge goes out from the part including s to the one including t, the edge is said to be "cut." This gives the method an ability to take neighbor interaction into account. There is one-to-one correspondence between partition of nodes and voxels. A score of the assignment (segmentation) is given by the sum of the edge weights that have been cut. The segmentation problem is thus mapped to a problem of finding the "minimum cut", that is, a cut with the minimum score.

Thus in step 23, a minimum-cut algorithm is applied to the graph. Any variant of minimum-cut algorithms, which are well known in the art, are known to solve this problem in polynomial time in the number of nodes and edges in the graph. The method possesses all topological properties as described/required above and can be applied to graphs embedded in any dimension, not only 3D.

Finally, in step 24, voxels are segmented according to the cut of the graph. If a voxel node belongs to the same partition as s, the voxel to which it corresponds is assigned the label s and belongs to S. Otherwise, it is assigned the label t and belongs to T. Because of the way that the edge weights are defined, the minimum cut corresponds to the optimal segmentation, that is, it has the minimum sum of equation (1).

Thus, the method partitions the voxels into two complementary subsets S and T, or, equivalently, assigns one of two labels s or t to each voxel, according to the criterion stated above.

An Illustration of the Process with the Simplest Example

Before going into the description of an embodiment, an illustration of the process of the invention by the simplest example is in order.

FIG. 3A schematically shows the simplest example. Two voxels u and v are shown as 301 and 302. The two voxels are neighbors of each other, which is indicated by a line segment 303 between them in the figure. Being neighbors means that the two voxels have some tendency to belong to the same partition upon segmentation. The corresponding graph that would be used in the method is shown in FIG. 3B. It has two voxel nodes 304 and 305 corresponding to the voxels 301 and 302, denoted by the same names u and v, and two additional nodes s (306) and t (307). For each of voxel nodes 304 and 305, there is an edge from s (306). The edge from s to u, denoted by (s,u), is shown as 308. Similarly, the edge (s,v) appears in the figure as 309. There are also two edges from u and v to t (307), i.e., (u,t) and (v,t), shown as 310 and 311. There also are edges (u,v) (312) and (v,u) (313) between voxel nodes u and v (304 and 305), representing the neighborhood structure.

The method finds a cut of the graph. A cut is a partition of the nodes into two groups, containing node s (306) and t (307) respectively. FIG. 4A through FIG. 4D show the four possible cut of the example graph shown in FIG. 3B. Two groups are shown as inside (S, containing node s (306)) and outside (T, containing node t (307)) of a dashed curve. Thus in FIG. 4A, only s (306) is inside and other three nodes are outside. In FIG. 4B, v (305) is also inside with s (306), and so on.

Given a cut of the graph, an edge going out from S to T is said to be cut. Thus, in FIG. 4A, edges (s,u) and (s,v) (308 and 309), and only these edges, are cut. Each edge has a nonnegative number called weight associated with it. The total score of a cut is the sum of weights of all cut edges. Thus, in FIG. 4A, the score of the cut is w(s,u)+w(s,v), where w(s,u) denotes the weight of the edge (s,u).

Note that one of, and only one of, the edges (s,u) (308) and (u,t) (310) is always cut. In FIG. 4A and FIG. 4B, (s,u) (308) is cut and (u,t) (310) is not; in FIG. 4C and FIG. 4D, (s,u) (308) is not cut and (u,t) (310) is. It is easy to see that (s,u) (308) is cut whenever u (304) belongs to T and (u,t) (310) is cut when it belong to S. Now, since the weights of these two edges are set so that $$w(s, u) - w(u, t) = a(u)$$

(see equation (2) above), the contribution of the two edges to the total score of the cut is a(u) more when u (304) belongs to T than when it belongs to S. Similarly, the weight contribution from edges (s, v) (309) and (v, t) (311) is larger by a(v) when v (305) belongs to T than when it is in S. Thus, compared to the state when all voxel nodes are in S, that is, the state of FIG. 4D, the sum of the weights of cut edges from s to voxel nodes and those from voxel nodes to t is larger by exactly $$\sum_{all\ x\ in\ T} a(x).$$

Note that a(x) can be either negative or positive number, or zero, for any voxel node x, though the weights must be nonnegative. Since the method finds the cut with the least score, a(x) should be negative if x is likely to belong to T, or positive if it is likely to belong to S, according to the local data for the voxel x.

The edges (v,u) (313) and (u,v) (312) between the voxel nodes u and v (304 and 305) are not cut when the two nodes belong to the same partition, as in FIGS. 4A and 4D. When one of the nodes u and v (304 and 305) is in S and another in T, one of the edges (v,u) (313) and (u,v) (312) is cut. In FIG. 4B, the edge (v,u) (313) is cut, that is, it goes from within S out to T, while the edge (u,v) (312) is not cut since it goes from outside into S. Ordinarily, the weight for the two edges can be set to the same value. Then, the contribution from the two edges to the total score depends only on whether the two voxel nodes belong to the same partition or not. If it is desirable, however, the two cases where u and v are separated (u in S and v in T as in FIG. 4C, or u in T and v in S as in FIG. 4B) can have different contributions, by letting the weights w(u,v) and w(v,u) have different values. Since the method looks for a cut with smaller total score, an edge with a smaller weight tends to be cut. Thus, if these weights are set relatively large, the two nodes tend to stay in the same partition. This gives the method a tendency to prefer a more smooth solution.

When the method finds the minimum cut, it resolves a trade-off. The likelihood of individual voxels to belong to either partition is given by the number a(u) and a(v). If both u and v are more likely to belong to S or T, there is no conflict; both would belong to the same partition, and result would be either like FIG. 4A or FIG. 4D. Or if the voxels have no tendency to stay in the same partition, that is, if the weights w(u,v) and w(v,u) are zero, again there is no conflict and each voxel can belong to the partition to which it tends to belong. If, however, neither are the case, there is a trade-off to be resolved. Although it is a trivial problem in this simplest example, it is in general a very difficult problem to solve.

An Embodiment of the Invention—MRI Image Segmentation

The method of present invention is described here in more details as may be utilized in the segmentation of arteries from MRI. Note that other non-intrusive imaging systems such as computed axial tomography (CAT) systems, ultrasound, positron emission tomography (PET), emission computed tomography (ECT) and multi-modality imaging (MMI), can also utilize the present segmentation method.

A Magnetic Resonance Imaging (MRI) system examines a tissue type of the human body by applying a gradient magnetic field of varying intensities to the human body, to thereby display the arrangement of nuclear spins of bodily tissue. That is, when a radio frequency (RF) pulse wave within a strong static magnetic field is applied to the human body, the nuclear spins of bodily tissue are excited and nuclear magnetic resonance (NMR) signals are generated when the gradient magnetic field appropriate for bodily tissue is applied. By tuning various parameters such as frequency, sequence and encoding of the RF pulse and magnetization angle; and measuring properties of the NMR signals such as intensity and relaxation time; the system gathers data that can then be processed by computer. The data is generally applied projection reconstruction techniques to give information about the type of bodily tissue at different spatial positions.

Figure 5:
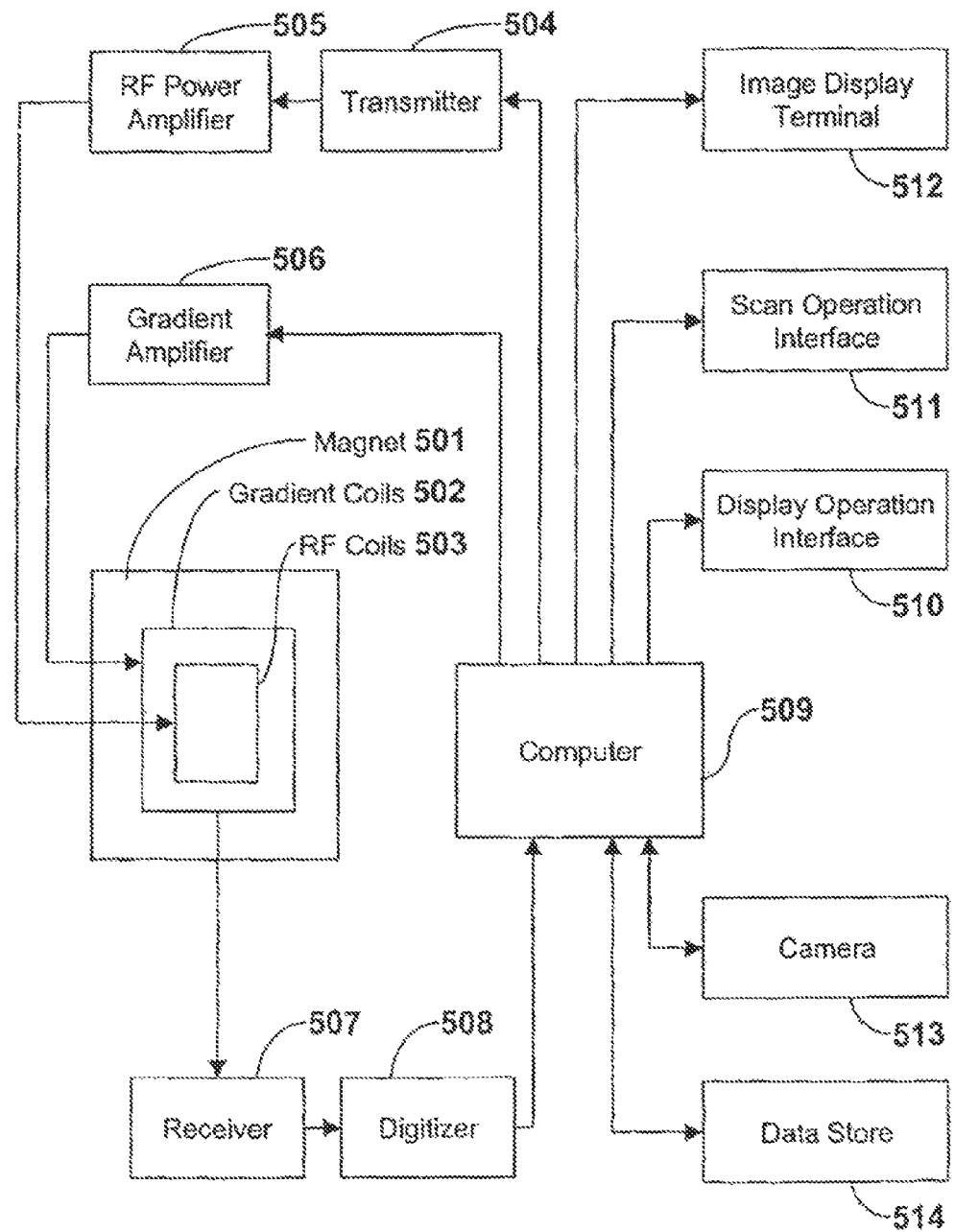
FIG. 5 is a block diagram of an MRI system that may be used in the present invention.

FIG. 5 is a block diagram of an MRI system that may be used in the present invention. The system comprises a magnet 501, gradient coils 502, RF coils 503 (the RF coils should be scaled to the anatomy of interest), transmitter 504, RF power amplifier 505, gradient amplifier 506, receiver 507, digitizer 508, computer 509, display interface 510, scan operation interface 511, image display terminal 512, camera 513 and data store 514. The computer 509 is programmed to acquire and segment data in order to find anatomies of interest in accordance with the above-described methods.

Here, it is assumed that such a data is given in the form of a 3D data structure, stored in the memory of a computer system, that gives a set of data that characterizes the tissue-type at each voxel. Although this data, which hereafter is called an MRI response, is not necessarily described in simple terms, it is well known in the art how to process and generate such data. (Reference is made to [W. Orrison, J. Lewine, J. Sanders, and M. Hartshorne. *Functional Brain Imaging*, Mosby-Year Book, St Louis, 1995.])

It is common in the art that such MRI response at each voxel is reduced to a number such that a particular number or a range of numbers correspond to a specific tissue type, so that a 2D array of such numbers as gray-scale intensity representing a cross-section of bodily-tissue can be displayed on a screen to be examined by a doctor. Accordingly, it is assumed here that the MRI response is given as a number at each voxel. However, it may be desirable depending on application that such MRI response at each voxel is given as more complex data such as a vector that, for instance, represents responses of the tissue to more than one parameter setting in the MRI process.

Here, as the input, the data structure is given as an L×N×M array D of double precision floating-point numbers. By specifying a voxel coordinate (l, n, m), the MRI response value D[l, n, m] can be accessed, where coordinate l runs from 1 to L, coordinate n runs from 1 to N, and coordinate m runs from 1 to M. Here, the 3D structure of the voxels directly corresponds to the physical 3D structure. The value at each voxel is an MRI response of the tissue at physical position (l×$d_1$, n×$d_2$, m×$d_3$) in some Cartesian physical coordinate system, where the physical distance between center of voxels to the three orthogonal directions are denoted by $d_1$, $d_2$, and $d_3$. That is, the physical distance between "physical" voxel (l, n, m) and (l+1, n, m) is $d_1$, between (l, n, m) and (l, n+1, m) $d_2$, and between (l, n, m) and (l, n, m+1) $d_3$.

As described above, the numbers due to MRI response have direct connection to the physical process of MRI. Different tissues, such as muscle, blood, brain matter, or bone, respond differently to MRI and yield different values. Here, a segmentation of artery is desired and it is assumed that a range ($d_{min}$, $d_{max}$) of MRI response value signifies artery. That is, it is assumed here to be known that, if the MRI response value D[l, n, m] falls between $d_{min}$ and $d_{max}$, the voxel at (l, n, m) is likely to be an artery voxel.

As the output, this embodiment will produce an L×N×M array B[l, n, m], which signifies the result of segmentation as B[l, n, m]=1 if the voxel at (l, n, m) is artery, and B[l, n, m]=0 if the voxel is non-artery.

Given the array D, a graph G is constructed. Here, an undirected graph, which is a special case of a directed graph, is used. It is well known in the art how to manipulate data structures on a computer to realize this end. One simple example is given below where an example minimum-cut algorithm is described.

Figure 6:
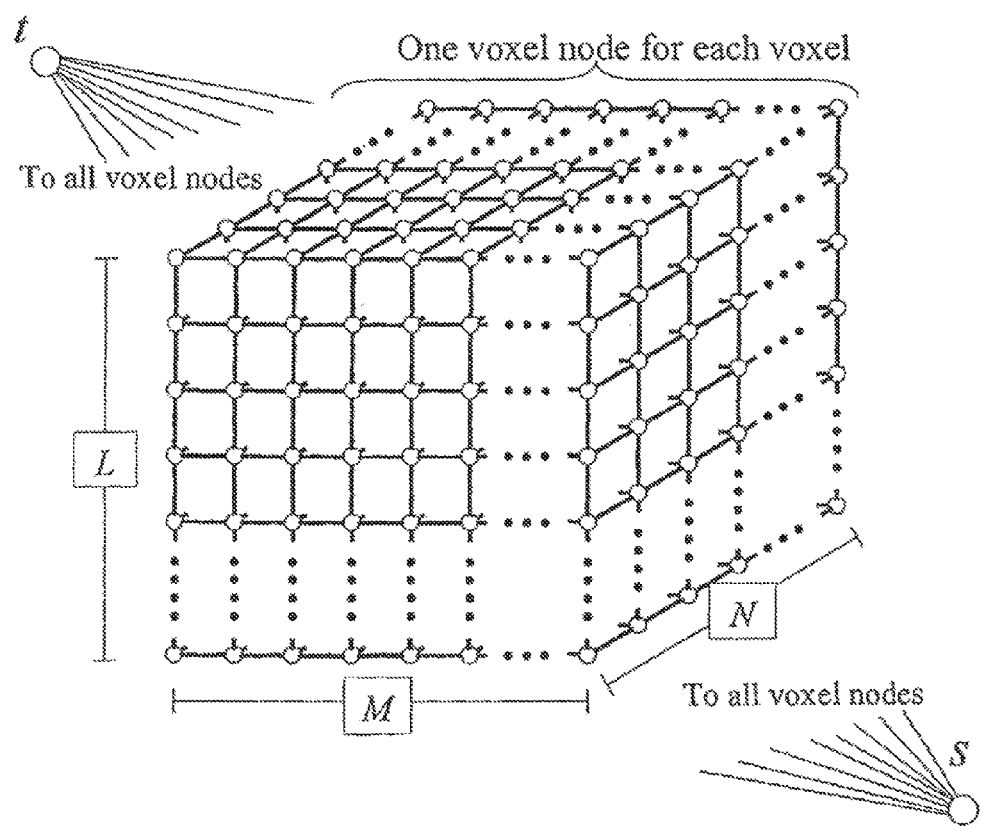
FIG. 6 is a schematic diagram showing a conceptual organization of the graph G in the case of three dimensions.

FIG. 6 shows a conceptual schematic of the graph organization. The set of nodes V comprises two special nodes s and t, and L×N×M voxel nodes corresponding to the voxels. The voxel node that corresponds to the voxel at coordinate (l, n, m) is herein denoted by v[l, n, m].

The set E of edges comprises the following two kinds of edges:

a) Each node v[l, n, m] is connected to both s and t. The edge connecting v[l, n, m] and s is denoted by $e_s$[l, n, m] and the edge connecting v[l, n, m] to t is denoted by $e_t$[l, n, m]. Hence there are 2×L×N×M edges of this kind.

b) Between the voxel nodes, neighboring nodes are connected. Here, in this example, the first nearest neighborhood system is used. Node v[l, n, m] is connected to nodes v[l−1, n, m], v[l+1, n, m], v[l, n−1, m], v[l, n+1, m], v[l, n, m−1], v[l, n, m+1], except when one or more of these six neighbors do not exist because they are out of the coordinate range, in which case only existing ones are connected. For instance, v[1, 2, M] is connected to v[2, 2, M], v[1, 1, M], v[1, 3, M], and v[1, 2, M−1], since v[0, 2, M] and v[1, 2, M+1] do not exist. The edge connecting v[l, n, m] and v[l+1, n, m] is denoted by $e_1$[l, n, m]; the edge connecting v[l, n, m] and v[l, n+1, m] is denoted by $e_2$[l, n, m]; and the edge connecting v[l, n, m] and v[l, n, m+1] is denoted by $e_3$[l, n, m]. Then there are 3×L×N×M−(L×N+N×M+L×M) edges of this kind.

Each edge has a nonnegative weight, that is, a double precision floating point number equal to or greater than zero. Hereafter the weight for edge e is denoted by w(e). For instance, edge $e_3$[2, 3, 4] that connects v[2, 3, 4] and v[2, 3, 5] has the weight w($e_3$[2, 3, 4]).

The weights of the edges are determined as follows.

a) The weights for the edges connecting voxel nodes to s and t are set as $w(e_s[l, n, m]) = (d_{max} - d_{min})^2$ $w(e_t[l, n, m]) = (d_{min} + d_{max} - 2 \times D[l, n, m])^2$.

The reader will note that, in (2), these weights correspond to $a(v[l, n, m]) = w(e_s[l, n, m]) - w(e_t[l, n, m]) = 4(d_{max} - D[l, n, m]) \cdot (D[l, n, m] - d_{min})$, which is 0 if D[l, n, m] equals to $d_{min}$ or $d_{max}$, positive if D[l, n, m] is between $d_{min}$ and $d_{max}$, and negative if D[l, n, m] is outside of the range [$d_{min}$, $d_{max}$]. Thus, according to the definition, it makes it more likely that the voxel be classified as artery if the value falls between $d_{min}$ and $d_{max}$.

b) The weight for the edges connecting neighboring nodes are set as $w(e_1[l, n, m]) = K/d_1$, $w(e_2[l, n, m]) = K/d_2$, and $w(e_3[l, n, m]) = K/d_3$, where K is a positive constant that governs smoothness of the segmentation. Resulting sets are smoother if K is larger. These correspond to $b(v[l, n, m], v[l+1, n, m]) = b(v[l+1, n, m], v[l, n, m]) = K/d_1$, $b(v[l, n, m], v[l, n+1, m]) = b(v[l, n+1, m], v[l, n, m]) = K/d_2$, and $b(v[l, n, m], v[l, n, m+1]) = b(v[l, n, m+1], v[l, n, m]) = K/d_3$, respectively.

Having set all the data needed to define a graph, a minimum-cut algorithm is applied to the graph. A minimum-cut algorithm divides the set of nodes into two parts so that s and t are separated. This division is called a cut of the graph. The algorithm moreover finds such a cut with the minimum value, where value of a cut is the sum of all the weights of edges whose ends lie in different parts according to the division.

Several minimum-cut algorithms are known, most of which use maximum-flow algorithm. All these algorithms give an identical results, hence which algorithm to use can be decided by reasons independent from the present invention. Also, there are known some approximation algorithms, such as the one described in [D. Karger. "A new approach to the minimum cut problem", *Journal of the ACM*, 43(4) 1996]. These are not guaranteed to give the minimum, but some cut that is close to the minimum. These can also be used for the present invention, and herein called minimum-cut algorithms. An example of minimum cut algorithm is given below.

Given the result of the minimum-cut algorithm, the output values B[l, n, m] for all l, n, and m are set as follows:

If node v [l, n, m] belongs to the same part as s, set B[l, n, m]=1.

Otherwise set B[l, n, m]=0.

Although these specific edge weights are defined here for the sake of concreteness, it is not necessary for the present invention to set the weights of the edges in this precise way. For instance, weight for an edge between neighboring voxel nodes can be set according to the difference of the data value D[l, n, m] between the two voxels so that it becomes greater if the values are closer, making it less likely for the voxels to be divided in different partitions.

A Minimum-cut Algorithm

Here, a simple minimum-cut algorithm that may be used with the present invention is described. It is described as may be used for higher dimensions, although by letting the constant DIM to be 3, it can be directly used with the preceding embodiment.

Although it is presented in a form similar to a Pascal-like programming language for clarity and concreteness, and is easy to understand by one skilled in the art, it is meant to illustrate the algorithm, not to be used as a program as it is.

The entry point is the procedure Mincut, which should be called after setting the input variable Size and Was described below. The result would be in the output variable B when it returns. The algorithm uses push-relabel maximum-flow algorithm with global relabeling. (Reference is made to [B. V. Cherkassky and A. V. Goldberg. "On implementing push-relabel method for the maximum flow problem." In *Proceedings of 4th International Programming and Combinatorial Optimization Conference*, 157-171, 1995.])

Constants
  DIM: Dimension of the space. In the 3D case above, DIM=3.
Types
  type NodeCoord: An array [0 . . . DIM−1] of integer; DIM-dimensional node coordinate.
  type EdgeCoord: An array [0 . . . DIM] of integer; edge coordinate.
  type NodeQueue: A queue of NodeCoord;
Notation:
  For a DIM-dimensional array X, the element X[vc[0], vc[1], . . . , vc[DIM−1]] of X pointed by a NodeCoord vc is abbreviated as X[vc]. Similarly, for a (DIM+1)-dimensional array Y, Y[ec] is a short hand for Y[ec[0], ec[1], . . . , ec[DIM]]. Also, a pair of an integer and a NodeCoord like (1, vc) denotes an EdgeCoord. For instance, if i is an integer and vc is a NodeCoord, Y[i, vc] means the element Y[i, vc[0], vc[1], . . . , vc[DIM−1]].
  In the algorithm, NodeCoord vc with vc[0]=−1 signifies the node s, and vc[0]=−2 means the node t.

A control structure for all vc do . . . is used to mean to iterate for all NodeCoord in the DIM-dimensional hypercube specified by Size (an input variable defined below.) For instance, in the 3D example above, this means to iterate for all L×N×M combination of coordinates.

Auxiliary Routines
  procedure Enqueue(vc: NodeCoord; var Q: NodeQueue);: pushes vc in the back of the queue Q.
  function Dequeue(var Q: NodeQueue): NodeCoord;: pops a NodeCoord vc from the queue Q and return vc.
  function Empty(var Q: NodeQueue): bool;: returns true if the queue Q is empty.
Input
  Size: NodeCoord; The size of the voxel array. DIM-dimensional vector.
  W: (DIM+1)-dimensional array of double
    W[0, vc]: weight of edge from s to vc
    W[1, vc]: weight of edge from vc to t
    W[1+d, vc]: weight of the edge from vc to the neighbor in d-th dimension (the node with the d-th coordinate+1.) In the 3D case,
    W[0, l, n, m]=w($e_s$[l, n, m]),
    W[1, l, n, m]=w($e_t$[l, n, m]),
    W[2, l, n, m]=w($e_1$[l, n, m]),
    W[3, l, n, m]=w($e_2$[l, n, m]),
    W[4, l, n, m]=w($e_3$[l, n, m])
Output
  B: DIM-dimensional array of integer. B[vc]=0 if the voxel at vc belongs to the same partition as s.
Global Variables
  In addition to Size, W, and B above, global variables are as follows:
  es, et: double precision floating point number (double) variables
  ds, dt, NUMNODE: integer variables
  curEdgeS, curEdgeT: NodeCoord variables
  excess: a DIM-dimensional array of doubles. One entry for each voxel.
  dist, curEdge: DIM-dimensional arrays of integers. One entry for each voxel.
  F: a (DIM+1)-dimensional array of doubles. The same size as W.
  Q: NodeQueue;
  s NodeCoord. s[0]=−1.
  t: NodeCoord. t[0]=−2.
The algorithm

```
function Excess(vc : NodeCoord) : double;
begin
    if vc[0] = -1 then Excess ← es          { node s }
    else if vc[0] = -2 then Excess ← et     { node t }
    else Excess ← excess[vc];
end
procedure SetExcess(vc : NodeCoord; e : double);
begin
    if vc[0] = -1 then es ← e               { node s }
    else if vc[0] = -2 then et ← e          { node t }
    else excess[vc] ← e;
end
function Distance(vc : NodeCoord) : integer;
begin
    if vc[0] = -1 then Distance ← ds        { node s }
    else if vc[0] = -2 then Distance ← dt   { node t }
    else Distance ← dist(vc);
end
procedure SetDistance(vc : NodeCoord; d : integer);
begin
    if vc[0] = -1 then ds ← d               { node s }
    else if vc[0] = -2 then dt ← d          { node t }
    else dist(vc) ← d;
end
function Active(vc : NodeCoord) : bool;
```

```
begin
    if vc[0] < 0 then Active ← false              { node s or t}
    else if (Distance(vc) ≥ 0) and (Excess(vc) > 0) then Active ← true
    else Active ← false;
end
function Inc(var vc : NodeCoord) : bool; {Increment for a DIM-dimensional iteration.}
var  d : integer; result : bool;
begin
    result ← false;
    d ← 0;
    while (d < DIM) and (result = false) do begin
        vc[d] ← vc[d] + 1;
        if vc[d] < Size[d] then result ← true
        else begin
            vc[d] ← 0;
            d ← d + 1;
        end
    end;
    Inc ← result;
end
procedure Reset(var vc : NodeCoord);
var  d : Integer;
begin
    for d ← 0 to DIM − 1 do vc[d] ← 0;
end
function GetEdge(vc : NodeCoord; var we : NodeCoord; var ec : EdgeCoord) : integer;
begin
    if vc[0] ≥ 0 then begin           { node other than s or t.}
        ec ← (0, vc);
        wc ← vc;
        if curEdge[vc] = 0 then begin
            ec[0] ← 0;
            wc ← s;
            result ← −1;
        end
        else if curEdge[vc] = 1 then begin
            ec[0] ← 1;
            wc ← t;
            result ← 1;
        end
        else begin
            if curEdge[vc] < 2 + DIM then begin
                ec[0] ← curEdge[vc];
                result ← 1;
            end
            else begin
                ec[0] ← curEdge[vc] − DIM;
                ec[ec[0] − 1] ← ec[ec[0] − 1] − 1;
                result ← −1;
            end;
            wc[ec[0] − 2] ← wc[ec[0] − 2] + result;
        end;
    end
    else if vc[0] = −1 then begin
        ec ← (0, curEdgeS[d]);
        wc ← curEdgeS;
        result ← 1;
    end
    else begin
        .ec ← (1, curEdgeS[d]);
        wc ← curEdgeT;
        result ← −1;
    end;
    GetEdge ← result;
end;
function ProceedEdge(vc : NodeCoord) : bool;
var  i : integer; result, loopout : bool;
begin
    result ← true;
    if vc[0] ≥ 0 then
        repeat begin
            loopout ← true;
            curEdge[vc] ← curEdge[vc] + 1;
            if curEdge[vc] = 2 + 2 × DIM then begin
                curEdge[vc] ← 0;
                result ← false;
            end
            else if curEdge[vc] > 1 then begin
                i ← curEdge[vc] − 2;
```

```
            if ((i < DIM) and (vc[i] ≥ Size[i] − 1)) or
               ((i ≥ DIM) and (vc[i − DIM] = 0)) then loopout ← false;
         end;
      end until loopout = true
   else if vc[0] = −1 then result ← Inc(curEdgeS)
   else result ← Inc(curEdgeT);
   ProceedEdge ← result;
end;
procedure ResetEdge(vc : NodeCoord);
var  i : integer;
begin
   if vc[0] ≥ 0 then curEdge[vc] ← 0
   else if vc[0] = −1 then Reset(curEdgeS)
   else Reset(curEdgeT);
end
procedure Relabel(vc : NodeCoord);
var  d, dw, mdw, r : integer; rf : double; wc : NodeCoord; ec : EdgeCoord; escape : bool
begin
   if Active(vc) = true then begin
      d ← Distance(vc);
      mdw ← −1;
      escape ← false;
      repeat begin
         r ← GetEdge(vc, wc, ec);
         rf ← W[ec] − r × F[ec];
         dw ← Distance(wc);
         if (rf > 0) and (d > dw) then begin
            ResetEdge(vc);
            escape = true;
         else if rf > 0 then begin
            if mdw = −1 then mdw ← dw + 1
            else mdw ← min(mdw, dw + 1);
         end;
      end until (escape = true) or (ProceedE,dge(vc) = false);
      SetDistance(vc, mdw);
   end;
end
procedure PushRelabel(vc : NodeCoord);
var  r : integer; delta, rf: double; wc : NodeCoord; ec : EdgeCoord; wactive : bool
begin
   NodeCoord wc;
   EdgeCoord ec;
   r ← GetEdge(vc, wc, ec);
   wactive ← Active(wc);
   if (Active(vc) = true) and (Distance(vc) = Distance(wc) + 1) then begin
      rf ← W[ec] − r × F[ec];
      if rf > 0 then begin
         delta ← min(Excess(vc), rf);
         F[ec] ← F[ec] + r × delta;
         SetExcess(vc, Excess(vc) − delta);
         SetExcess(wc, Excess(wc) + delta);
      end
      else if ProceedEdge(vc) = false then Relabel(vc);
   end
   else if ProceedEdge(vc) = false then Relabel(vc);
   if (wactive = false) and (Active(wc) = true) then Enqueue(wc, Q);
end
procedure Initialize;
var  i : integer; w : double; vc : NodeCoord;
begin
   Reset(curEdgeS);
   Reset(curEdgeT);
   NUMNODE ← 1;
   for i ← 0 to DIM − 1 do NUMNODE ← NUMNODE × Size[i];
   NUMNODE ← NUMNODE + 2;
   ds ← NUMNODE; dt ← 0; es ← 0; et ← 0;
   for all vc do begin
      w ← W[0, vc];
      F[0, vc] ← w;
      if w > 0 then Enqueue(vc, Q);
      excess[vc] ← w;
      dist(vc) ← 0;
      curEdge[vc] ← 0;
      for i ← 1 to DIM + 1 do F[i, vc] ← 0;
   end;
end
procedure BFS(root : NodeCoord; initdist : integer); {Breadth first search in residual graph.}
var  d, r, dw : integer; rf : double; vc, wc : NodeCoord; ec : EdgeCoord; Q2 : NodeQueue;
begin
```

```
-continued

SetDistance(root, initdist);
      Enqueue(root, Q2);
      while Empty(Q2) = false do begin
        vc ← Dequeue(Q2);
        ResetEdge(vc);
        d ← Distance(vc);
        repeat begin
          r ← GetEdge(vc, wc, ec);
          dw ← Distance(wc);
          if dw = -1 then begin
            rf ← W[ec] + r × F[ec];
            if rf > 0 then begin
              SetDistance(wc, d + 1);
              Enqueue(wc, Q2);
            end;
          end;
        end until (ProceedEdge(vc) = false);
      end;
    end
    procedure GlobalRelabel;
    var vc : NodeCoord;
    begin
      for all vc do SetDistance(vc, -1);
      BFS(t, 0);
      BFS(s, NUMNODE);
    end
    procedure FindCut;
    var vc : NodeCoord;
    begin
      for all vc do SetDistance(vc, -1);
      BFS(t, 0);
      for all vc do if Distance(vc) = -1 then B(vc) ← true else B(vc) ← false;
    end
    procedure Maxflow;
    var vc : NodeCoord; c : integer;
    begin
      Initialize;
      while Empty(Q) = false do begin
        vc ← Dequeue(Q);
        d ← Distance(vc);
        repeat PushRelabel(vc) until (Excess(vc) = 0) or (Distance(vc) ≠ d);
        if Active(vc) = true then Enqueue(vc, Q);
        c ← c + 1;
        if c > NUMNODE then begin
          c ← 0;
          GlobalRelabel;
        end;
      end;
    end
    procedure Mincut;
    var vc : NodeCoord; c : integer;
    begin
      Maxflow;
      FindCut;
    end
```

RAMIFICATIONS AND SCOPE

While only certain preferred features of the invention have been illustrated and described herein, many modifications and changes will occur to those skilled in the art.

For instance, weight for an edge between neighboring voxel nodes can be set according to the difference of the data value between the two voxels so that it becomes greater if the values are closer to each other, making it less likely for the voxels to be divided in different partitions.

As mentioned above, the method of present invention can use either directed or undirected graph. According to the application and the specific implementation of the data structures, either can be more convenient than the other.

Also, there are known ways to handle specific cases more efficiently. First, if there is any edge with a zero weight in the graph, the edge can be removed without affecting the result of the segmentation. Second, if there is a pair of nodes that are very strongly connected, that is, if the nodes are connected by either (a) edges with very large weights in both directions in the directed case, or (b) by an undirected edge with a very large weight in the undirected case, these nodes will never be separated in the minimum-cut algorithm. Thus, it is possible to merge these two nodes into one node to improve the efficiency. These are well known in the art as pre-processes of minimum-cut algorithms. In such a case, there may be fewer voxel nodes than input voxels. This can be seen as corresponding voxel nodes being designated to each input voxel. In the embodiment above, the designation is a simple one to one correspondence. It can be, however, such that more than one voxel have the same designated voxel node. This simply means two voxels that has the same designated corresponding voxel node cannot be separated. After the minimum cut is found, i.e., the nodes are partitioned into groups, the segmentation of the voxels can be readily found by assigning each voxel to the segment corresponding to the group to which the voxel's corresponding voxel node belongs.

Figure 7A:
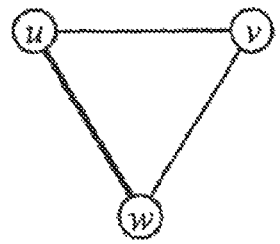
FIG. 7A shows the simplest example to illustrate merging.
Figure 7B:
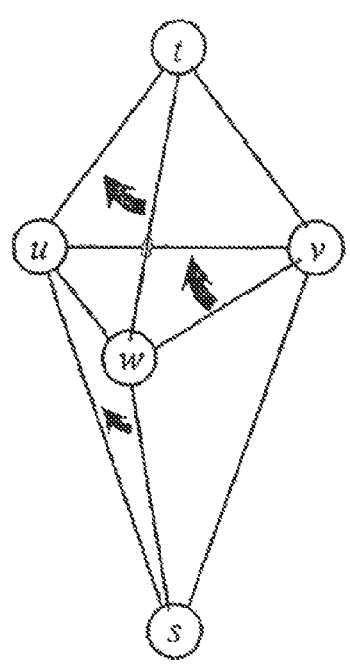
FIG. 7B shows the corresponding graph that would be used in the method of present invention to solve the problem shown in FIG. 7A.
Figure 7C:
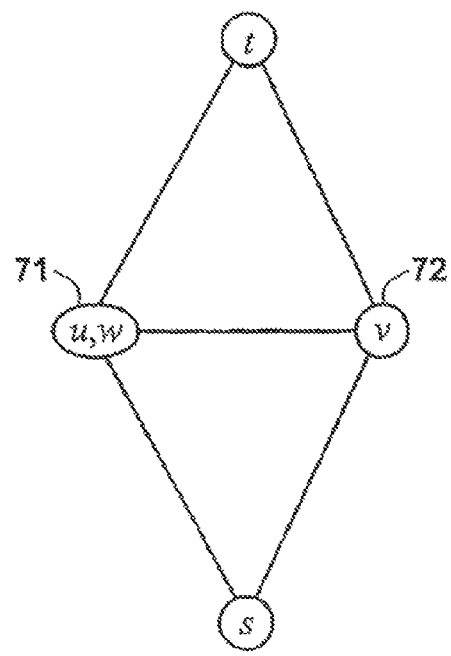
FIG. 7C shows the result of merging two nodes in the graph shown in FIG. 7B.

FIG. 7A shows the simplest example to illustrate this. There are three voxels, u,v, and w. Each voxel is neighbor of other two. Suppose the voxels u and w are known to have so strong a tendency to stay in the same segment that it can be assume they never can be separated. The undirected version of the method of present invention would usually give the graph shown in FIG. 7B. However, it is known that the graph shown in FIG. 7C would give an equivalent solution with fewer nodes and edges. Here, the nodes u and w are merged to one node 71. The edges connecting s, t, or v and u and w are also merged and their weights added together. Thus, instead of edges (s,u) and (s,w) in FIG. 7B, there is only one edge from s to node 71 in FIG. 7C with a weight equal to the sum of weights of the original edges. In this example, node 71 is designated as the voxel node corresponding to both u and w. Node 72 is, on the other hand, designated as the voxel node corresponding to only one voxel, which is v, as in the ordinary case. By repeating this, it is possible to merge more than one node. The weight of an edge connecting some node x and a merged node y is given by the sum of weights of all edges that connect node x and all nodes that are merged into y. In the context of the present invention, this means that the equation (2) becomes, for a voxel node v, $$w(s, v) - w(v, t) = \sum_{\text{all } x \text{ corresponding to } v} a(x).$$

Note if as in the embodiment above, each voxel node corresponds to exactly one voxel, this equation reverts to (2). This is nothing but an obvious result of applying the merging to the present context. This process of merging is well known in the art and its addition should not be considered to bring the resultant method out of the scope of the present invention.

Finally, as mentioned above, there are known more than one minimum-cut algorithms. Also, there are approximation algorithms that give approximate minimum cut. Moreover, some approximation algorithms can give so-called multi-way-cut that partitions the graph into more than two groups. Such algorithms however can be easily incorporated into the scheme of the present invention by those skilled in the art.

It is, therefore, to be understood that the appended claims are intended to cover all such modifications and changes as fall within the true spirit of the invention.

We claim:

1. A non-transitory computer-accessible medium having stored thereon computer-executable instructions for segmenting at least one image, wherein, when a computer arrangement executes the instructions, the computer arrangement is configured to perform procedures, comprising:
    receiving data associated with the at least one image;
    generating a plurality of nodes based on the data;
    assigning at least one weight based on information associated with the nodes; and
    segmenting the at least one image based on the nodes and the at least one weight using a minimum cut procedure.

2. The computer-accessible medium of claim 1, wherein the computer arrangement is further configured to determine at least one edge between at least two of the nodes.

3. The computer-accessible medium of claim 2, wherein the computer arrangement is further configured to assign the at least one weight to the at least one edge based on a distance between the at least two of the nodes.

4. The computer-accessible medium of claim 3, wherein the computer arrangement is further configured to merge the at least two nodes based on a substantially large weight for at least one of the at least one edge in both directions between the nodes or at least one undirected edge in one direction between the at least two of the nodes.

5. The computer-accessible medium of claim 3, wherein the computer computer-arrangement is further configure to remove the at least one edge if the at least one weight assigned to the at least one edge is 0.

6. The computer-accessible medium of claim 3, wherein the computer arrangement is further configured to generate at least one graph based on the nodes and the at least one edge.

7. The computer-accessible medium of claim 6, wherein the computer arrangement is further configured to map at least one of at least one pixel or at least one voxel to at least one of the nodes of the graph.

8. The computer-accessible medium of claim 6, wherein the computer arrangement is further configured to (i) segment the at least one graph into at least two parts, and (ii) place each of the nodes in a single part of the graph.

9. The computer-accessible medium of claim 8, wherein the computer arrangement is further configured to cut or remove the at least one edge if the at least two of the nodes belong to different parts of the at least one graph.

10. The computer-accessible medium of claim 9, wherein at least one edge includes a plurality of edges, and wherein the segmenting is performed with a particular minimum cut of the minimum cut procedure based on a sum of a plurality of weights of the edges that have been cut.

11. The computer-accessible medium of claim 10, wherein the computer arrangement is further configured to segment at least one of a plurality of pixels or a plurality of voxels based on the particular minimum cut.

12. The computer-accessible medium of claim 8, wherein the computer arrangement is further configured to keep the at least one edge if the at least two of the nodes belong to a same part of the at least one graph.

13. The computer-accessible medium of claim 8, wherein the computer arrangement is further configured to assign at least one label to each of the nodes based on the single part of the graph that a particular node of the nodes is placed in.

14. The computer-accessible medium of claim 6, wherein the at least one graph is a directed edge graph.

15. The computer-accessible medium of claim 1, wherein the at least one weight is non-negative.

16. The computer-accessible medium of claim 1, wherein the at least one weight is a double precision floating point number greater than or equal to 0.

17. The computer-accessible medium of claim 1, wherein the segmenting procedure is further based on a sum of a plurality of weights.

18. The computer-accessible medium of claim 1, wherein the segmentation procedure is further based on at least one segmentation of the image having a minimum sum equation substantially equal to 1.

19. A method for segmenting at least one image, comprising:
    receiving data associated with the at least one image;
    generating a plurality of nodes based on the data;
    assigning at least one weight based on information associated with the nodes; and using a computer hardware arrangement, segmenting the at least one image based on the nodes and the at least one weight using a minimum cut procedure.

20. A system for segmenting at least one image, comprising:
   a computer hardware arrangement:
   receive data associated with the at least one image;
   generate a plurality of nodes based on the data;
   assign at least one weight based on information associated with the nodes; and
   segment the at least one image based on the nodes and the at least one weight using a minimum cut procedure.

* * * * *